US012779981B2

(12) United States Patent
Capelle et al.

(10) Patent No.: US 12,779,981 B2

(45) Date of Patent: Nov. 3, 2026

(54) AIR GUIDANCE SYSTEM

(71) Applicant: AGCO International GmbH, Neuhausen (CH)

(72) Inventors: Thorsten Capelle, Marktoberdorf (DE); Markus Bräutigam, Marktoberdorf (DE)

(73) Assignee: AGCO International GmBH, Neuhausen (CH)

(*) Notice: Subject to any disclaimer, the term of this patent is extended or adjusted under 35 U.S.C. 154(b) by 184 days.

(21) Appl. No.: 18/844,604

(22) PCT Filed: Feb. 16, 2023

(86) PCT No.: PCT/IB2023/051405

§ 371 (c)(1),
(2) Date: Sep. 6, 2024

(87) PCT Pub. No.: WO2023/180828

PCT Pub. Date: Sep. 28, 2023

(65) Prior Publication Data

US 2025/0187429 A1 Jun. 12, 2025

(30) Foreign Application Priority Data

Mar. 25, 2022 (GB) .................................... 2204216

(51) Int. Cl.

| | |
|---|---|
| ***B60K 11/08*** | (2006.01) |
| ***B60K 11/04*** | (2006.01) |
| ***F01P 5/06*** | (2006.01) |

(52) U.S. Cl.

CPC .............. *B60K 11/08* (2013.01); *B60K 11/04* (2013.01); *F01P 5/06* (2013.01); *B60Y 2200/221* (2013.01)

(58) Field of Classification Search

CPC .. B60K 11/08; B60K 11/04; F01P 5/06; F01P 3/18; F01P 11/10; B60Y 2200/221

See application file for complete search history.

(56) References Cited

U.S. PATENT DOCUMENTS 3,226,025 A * 12/1965 Ferris .................. B60K 11/085 236/35

3,857,453 A * 12/1974 Buttke .................. B62D 49/06 181/204

(Continued)

FOREIGN PATENT DOCUMENTS

JP S63270228 A 11/1988

JP 4163555 B2 10/2008

OTHER PUBLICATIONS

UK Intellectual Property Office, Search Report for related UK Application No. GB2204216.2, dated Sep. 26, 2022, 3 pages.

(Continued)

*Primary Examiner* — Medhat Badawi

(57) ABSTRACT

An engine cooling arrangement for a utility vehicle having an engine compartment at least partly enclosed by a bonnet in which an engine is located. The engine is cooled by the engine cooling arrangement which comprises at least one radiator and a blower to create an air flow through the radiator into the engine compartment. An air guidance system guides the air flow leaving the radiator to air outlets located at either side of the engine compartment to prevent temperature-sensitive components from overheating. The air guidance system may comprise louvres shaped to guide the air flow and which may be adjustable.

13 Claims, 6 Drawing Sheets

(56) References Cited

U.S. PATENT DOCUMENTS 3,982,600 A * 9/1976 Gerresheim ........ B60R 13/0838 181/207
4,607,565 A * 8/1986 Sugawara ............ F24F 13/075 454/319
4,995,447 A * 2/1991 Weidmann ............ B60K 11/08 165/44
5,181,554 A * 1/1993 Mita ...................... F28D 1/024 165/44
5,588,482 A * 12/1996 Holka .................... B60K 11/08 165/44
6,142,213 A * 11/2000 Gallivan .................. F01P 11/10 165/41
6,230,832 B1 * 5/2001 von Mayenburg .... B60K 11/08 180/68.1
6,739,419 B2 * 5/2004 Jain ........................ B60K 11/00 180/68.1
6,971,440 B1 * 12/2005 Beck .................. B60H 1/00064 165/203
7,017,531 B2 * 3/2006 Wooldridge ........... B60K 11/02 123/41.11
7,537,072 B2 * 5/2009 Sturmon .................. F01P 11/10 180/69.2
7,753,152 B2 * 7/2010 Nakae ...................... F01P 11/10 165/41
8,028,522 B2 * 10/2011 Irmler .................... F02M 26/24 123/41.31
8,327,811 B2 * 12/2012 Hokimoto ............... E02F 3/301 123/41.04
8,967,307 B2 * 3/2015 Kim .......................... F01P 5/02 180/68.1
11,091,026 B2 * 8/2021 Mussack ................ B60K 13/02
11,092,065 B2 * 8/2021 Sheidler ............. B01D 46/0042
11,725,569 B1 * 8/2023 Abeysinghe ............. F01P 11/10 123/42
12,078,988 B2 * 9/2024 Hurd .................... A01B 69/008
12,482,267 B2 * 11/2025 Iwase ..................... G06V 20/56
2011/0284298 A1 * 11/2011 Ajisaka .............. B60H 1/00542 180/65.21
2013/0068177 A1 * 3/2013 Yotsuzuka ............... F01P 11/10 123/41.58
2013/0139997 A1 * 6/2013 Murakami .............. B60L 50/71 165/41
2016/0001629 A1 * 1/2016 Rohr ...................... B60K 11/04 165/76
2016/0096424 A1 * 4/2016 Schiller .................. B60K 11/04 180/68.1
2016/0318387 A1 * 11/2016 Kuhn ..................... B60K 13/02
2017/0218808 A1 * 8/2017 Kurokawa .............. F02B 77/11
2017/0218832 A1 * 8/2017 Kurokawa ............. B62D 25/04
2018/0264932 A1 * 9/2018 Okugawa ................. F01P 11/10
2018/0304936 A1 * 10/2018 Watabe ...................... F01P 1/06
2023/0221728 A1 * 7/2023 Iwase ..................... G06V 20/56 701/50
2023/0322193 A1 * 10/2023 Moradnia ................. B60T 5/00 454/162
2025/0187429 A1 * 6/2025 Capelle ..................... F01P 3/18

OTHER PUBLICATIONS

European Patent Office, Search Report for related PCT Application No. PCT/IB2023/051405, dated Jul. 12, 2023, 13 pages.

* cited by examiner

AIR GUIDANCE SYSTEM

CROSS-REFERENCE TO RELATED APPLICATIONS

This application is a national phase entry under 35 U.S.C. § 371 of International Patent Application PCT/IB2023/051405, filed Feb. 16, 2023, designating the United States of America and published in English as International Patent Publication WO2023/180828 A1 on Sep. 28, 2023, which claims the benefit of the filing date of U. K. Patent Application 2204216.2, "Air Guidance System," filed Mar. 25, 2022, the entire disclosure of which is incorporated herein by reference.

FIELD

Embodiments of the present disclosure relate generally to an engine cooling arrangement for a utility vehicle having an engine compartment enclosed by a bonnet (i.e., hood) and more particularly, but not exclusively, to an air guidance system for such cooling system in an agricultural vehicle.

BACKGROUND

Generally, a utility vehicle (e.g., an agricultural vehicle such as an agricultural tractor, harvester, combine, etc. or a construction vehicle such as a digger, excavator, and the like) includes a vehicle frame, a cabin for an operator of the vehicle, an internal-combustion engine, and an engine cooling system including a radiator arranged inside an engine compartment.

An engine cooling arrangement in utility vehicles, in particular in tractors, has to be configured in such a way that an optimally large number of components located on the utility vehicle can be cooled. Cool, external ambient air drawn in via an air intake unit is conveyed through a radiator/heat exchanger to cool coolant in a cooling circuit. The air warmed by the radiator/heat exchange then runs over further high temperature components in the engine compartment, such as the internal-combustion engine itself, and is heated further thereby. Often temperature sensitive components, such as an electronic controller, are located in the engine compartment. As a consequence of the external ambient air being heated, it may not be suitable for cooling such temperature-sensitive components and indeed, the air flow may cause the ambient temperature of the temperature-sensitive components to become too high. These temperature-sensitive components consequently have to be additionally cooled, for example by way of a connection to a cooling fluid (e.g. water) circuit. This increases the number of components and complexity of the utility vehicle, adding to the assembly tome and therewith the costs for the entire utility vehicle.

Therefore it would be useful to have an engine cooling system which is configured to reduce overheating of temperature-sensitive components in an engine compartment of a utility vehicle.

BRIEF SUMMARY

Aspects of the invention relate to an engine cooling arrangement for utility vehicles, especially agricultural vehicles, whereby the cooling arrangement comprises at least one radiator located toward one end of an engine compartment of the utility vehicle and at least one blower or fan to create an airflow through the radiator in a direction towards the engine, wherein an air guidance system is associated with the radiator to modify the direction of the air flow exiting the radiator in a manner that reduces the tendency for heat sensitive components in the engine compartment to overheat as a result of the flow of air which has passed through the radiator air passing over them.

In an aspect of the invention there is provided an utility vehicle having an engine and an engine cooling arrangement arranged inside of an engine compartment, the cooling arrangement comprises at least one radiator and at least one blower to create an airflow through the cooling arrangement, the engine compartment having air outlets including air outlets arranged in side regions of the engine compartment, whereby an air guidance system associated with the radiator guides the air flow to air outlets located in side regions of the engine compartment.

By directing air flow exiting the radiator to air outlets at either side of the engine compartment, the air flow can be directed away from heat sensitive components mounted elsewhere in the engine compartment.

In some embodiments, the air guidance system may include louvers to guide the air flow toward air outlets at the sides of the engine compartment.

At least one louver may comprise a first curvature to improve the air flow toward one of the air outlets.

The first curvature may preferably guide the air flow exiting the radiator laterally towards an air outlet located in a side region of the engine compartment, when considered in regards to a longitudinal axis of the utility vehicle which aligns with the main driving direction of the utility vehicle during normal circumstances.

At least one louver may also comprise at least one additional curvature to guide the air flow toward said one of the air outlets. This additional curvature may be a second curvature configured to guide parts of the air flow in a diagonally upward direction toward an air outlet located in a side region of the engine compartment. This may be advantageous since some parts of the hot air flow from a lower part of the radiator might not be vertically aligned with the air outlets and therefore might otherwise be deflected within the engine compartment towards heat sensitive components.

The additional curvature may be a third curvature and may be configured to guide parts of the air flow in a diagonally downward direction toward an air outlet located in a side region of the engine compartment. This may be advantageous since some parts of the hot air flow from an upper part of the radiator might not be vertically aligned with the air outlet and therefore might otherwise be deflected through the engine compartment alongside the engine towards heat sensitive components mounted in the engine compartment. In another embodiment, a third curvature may guide the air flow upward to an additional air outlet located in an upper region of the engine compartment, which may be located in a hood or bonnet which at least partly defines the engine compartment. Louvers with such a third curvature may be arranged in a horizontal direction to guide the air flow toward the additional air outlet.

Since air outlets are arranged on opposite sides of the engine compartment the louvers of the air guidance system may be configured such that louvers located at a first side of the radiator direct the air flow to an air outlet at a first side of the engine compartment and louvers at a second side of the radiator direct the air flow to an air outlet at a second side of the engine compartment. In such an embodiment, the orientation, especially the curvature, of the louvers at the first side of the radiator may be mirrored to the orientation of the louvers at the second side of the radiator.

The engine compartment may comprise additional air outlets arranged in the top or bottom side of the engine compartment. The air guidance system may comprise additional louvers, which guide at least a part of the air flow from the radiator to the additional air outlets.

The air guidance system associated with the engine cooling compartment may be attached to the radiator directly to guide the hot air flow created by the blower and flowing through the radiator.

The engine cooling arrangement may comprise at least one additional air guiding element attached to the engine and/or the inside of a bodywork component defining the engine compartment (such as a bonnet) to prevent unwanted air flow to specific areas of the engine compartment in which at least one heat sensitive component is located. This may be advantageous in protecting heat sensitive components in the engine compartment from hot air flow from the radiator which is not guided perfectly to the air outlets, The engine of the utility vehicle may comprise one or more components which in operation have a higher temperature than the typical temperature of the air flow from the radiator and would therefore profit from an air flow from the radiator flowing around them to aid in cooling. To achieve this, the additional air guiding element may comprise an opening, or be otherwise profiled, to allow part of the air flow from the radiator to flow around at least one such component.

A high temperature component may be a turbocharger connected to the engine of the utility vehicle, whereby the additional air guiding element may be configured to allow part of the air flow from the radiator to flow around the turbocharger.

A high temperature component may be an exhaust gas collection pipe arranged inside of the engine compartment near the engine, whereby the additional air guiding element may be configured to allow part of the airflow from the radiator to flow around the turbocharger.

A single additional air guiding element may be configured to direct air flow from the radiator over more than one high temperature component, such as a turbocharger and an exhaust gas collection pipe.

In one embodiment the louvers may be adjustable automatically by an actuator, for example an electric motor.

At least one of the louvers of the air guiding system may further be individually adjustable by at least one actuator.

The adjustment of the at least one louver may preferably be an adjustment of the orientation of the louver.

The utility vehicle using this system may in particular be an agricultural vehicle such as a tractor, harvester or a combine.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the disclosure will now be described, by way of example only, with reference to the accompanying drawings, in which.

DETAILED DESCRIPTION

Embodiments of the disclosure will now be described with reference to the drawings to enable practice of aspects of the invention. Although aspects of the invention are described with reference to these specific preferred embodiments, it will be understood that the invention is not limited to these preferred embodiments. But to the contrary, aspects of the invention include numerous alternatives, modifications and equivalents as will become apparent from consideration of the following detailed description.

Figure 1:
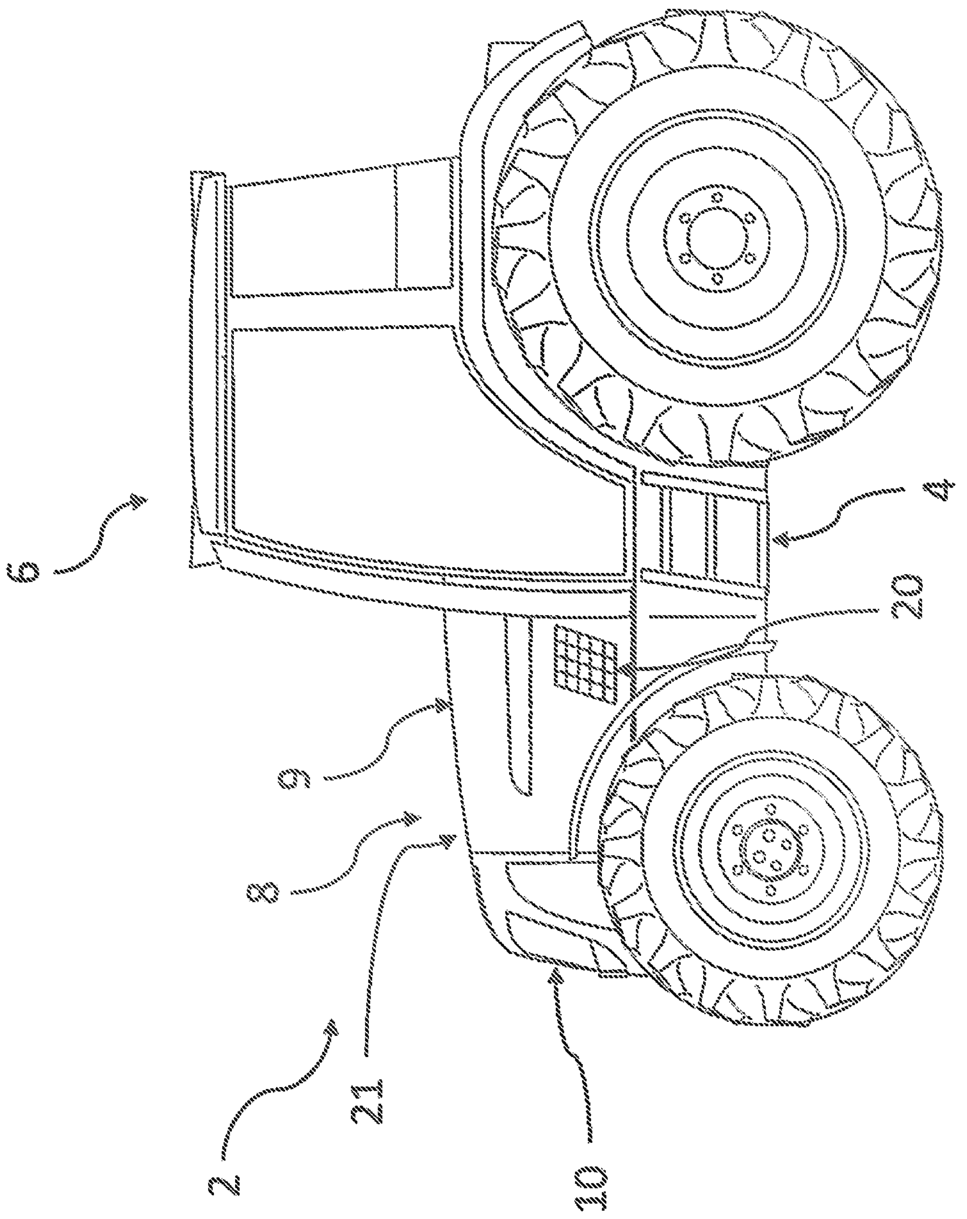
FIG. 1 illustrates a utility vehicle in form of an agricultural tractor.
Figure 2:
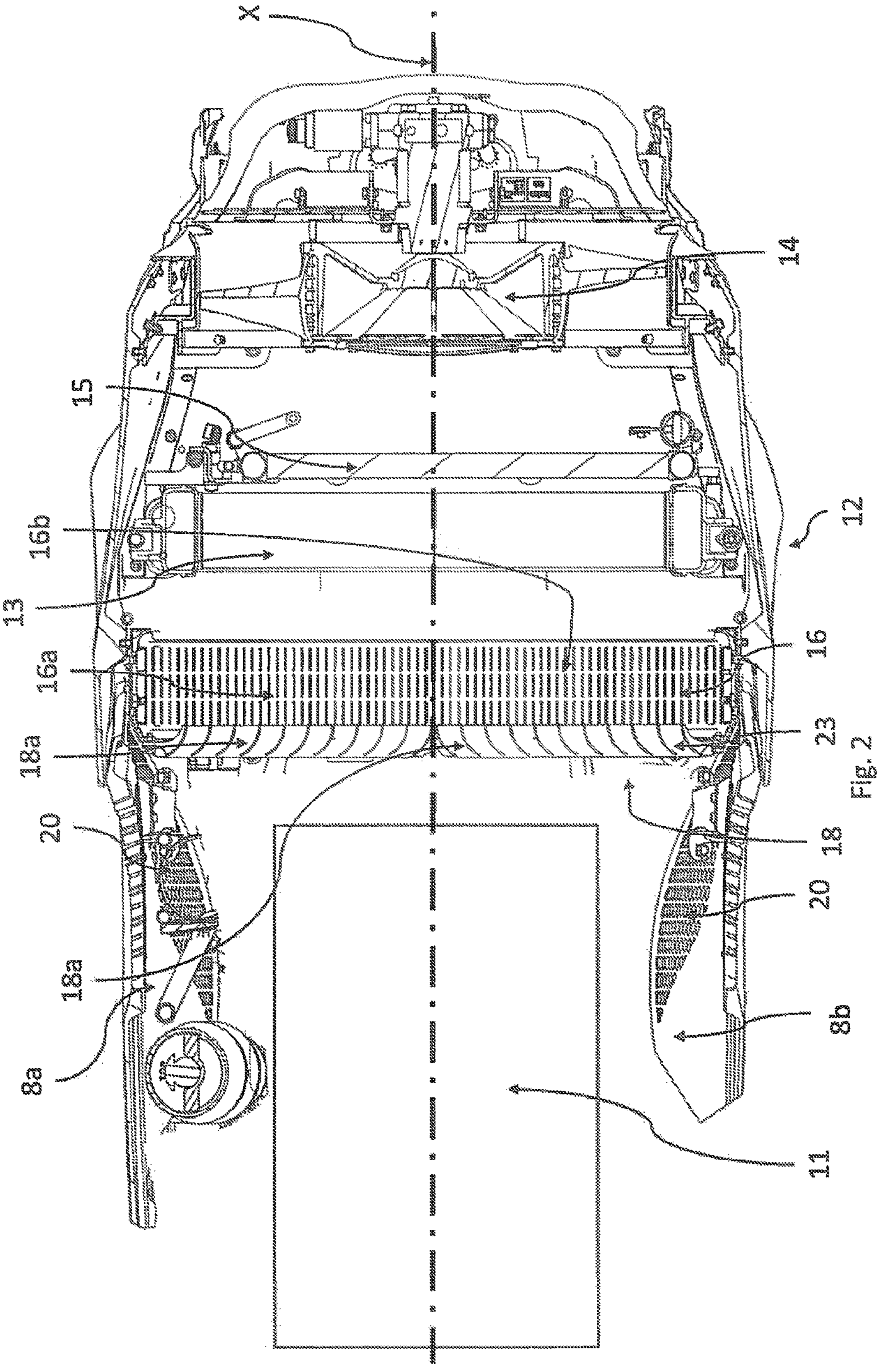
FIG. 2 shows a top cutaway view of an engine compartment of the tractor of FIG. 1 illustrating an embodiment of an engine cooling arrangement with an air guidance system in accordance with the present disclosure.

FIG. 1 illustrates a utility vehicle 2 in the form of an agricultural tractor. The tractor 2 has a vehicle frame or chassis 4 supporting a cabin 6, which defines an enclosed interior space or environment for an operator of the utility vehicle. The tractor 2 further comprises an engine compartment 8, in which an engine 11 and an engine cooling arrangement 12 (as shown in FIG. 2) are contained. The engine compartment 8 is at least partly defined by a bonnet 9 which extends over and down opposing lateral sides of the engine compartment, at least when in a closed position. An air inlet 10 is located in a front part of the engine compartment 8 and air outlets 20 are arranged at opposing sides of the engine compartment 8.

The sides of the engine compartment 8 are more precisely a first side 8*a* and a second side 8*b*, which are arranged on opposite sides of the engine 11. The engine 11 is located behind an engine cooling arrangement 12 which includes a radiator 16, an intercooler 13, a condenser 15 and a blower 14, whereby the blower 14 creates an air flow flowing through the cooling arrangement 12 in a direction towards the engine 11. The radiator 16, intercooler 13, condenser 15 and blower 14 are aligned transversely relative to a longitudinal axis X of the utility vehicle 2, which corresponds also with a standard driving direction under normal circumstances. The air enters through the air inlet 10 from outside of the engine compartment 8, flows through the engine cooling arrangement 12 including the blower 14, the condenser 15, the intercooler 13 and the radiator 16 and exits the engine compartment 8 through the air outlets 20 arranged at the first and second side 8*a*, 8*b* of the engine compartment 8.

The air flow passing through the radiator 16 is guided an air guidance system 18 to avoid overheating of the engine 11 and other temperature sensitive components in the engine compartment 8. The air guidance system 18 includes louvers 23 which guide air flow exiting the radiator 16 to the air outlets 20 on either side 8*a*, 8*b* of the engine compartment 8. Each louver 23 comprising a first curvature 18*a* extends generally in a vertical direction and is configured to guide the air flow to one side of the engine compartment 8 (e.g., to one side of the engine 11) and towards a respective one of the air outlets 20. Terms such as "side" or "lateral" in this context should be understood with reference to the longitudinal axis X of the utility vehicle 2. The louvers 23 are divided into two sets. A first set is located to cover half of the radiator exit face on one 16*a* of the radiator 16 and are oriented toward a first of the air outlets 20 provided at the first side 8*a* of the engine compartment 8. A second set is located to cover half of the radiator exit face on the other side 16*b* of the radiator 16 and is oriented toward a second of the air outlets 20 at the second side 8*b* of the engine compartment 8. The orientation of the louvers 23 in the first and second sets are mirrored about a vertical plane extending through the longitudinal axis X in this embodiment.

The term "vertical" in this context refers to a direction perpendicular to the ground on which the utility vehicle standing. "Substantially vertical" should be understood as encompassing a direction perpendicular to the ground on which the utility vehicle standing ±5 degrees. Similarly, the term "horizontal" in this context refers to a direction parallel to the ground on which the utility vehicle standing. "Substantially horizontal" should be understood as encompassing a direction parallel to the ground on which the utility vehicle standing ±5 degrees.

Figure 3:
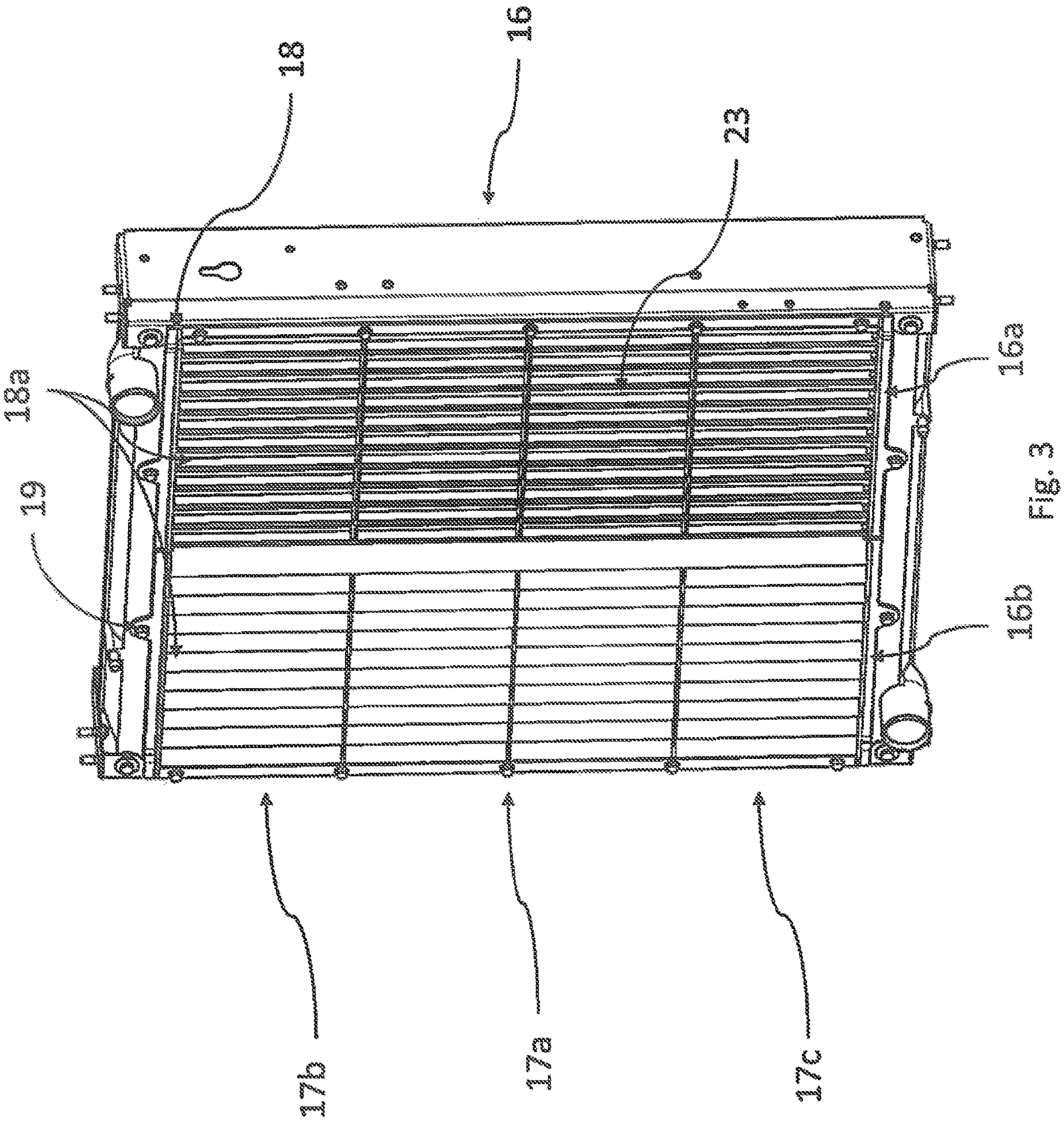
FIG. 3 illustrates a radiator firming part of the engine cooling arrangement including part of the air guidance system of FIG. 2.

The first curvature 18*a* of the louvers 23 is also illustrated in FIG. 3, which shows the radiator 16 and the directly attached louvers 23. The louvers 23 are provided as part of a louver assembly which is attached to the radiator 16. The louver assembly can be attached to the radiator by any suitable method, such as by use of releasable fasteners 19 in form of screws or the like.

Figure 6:
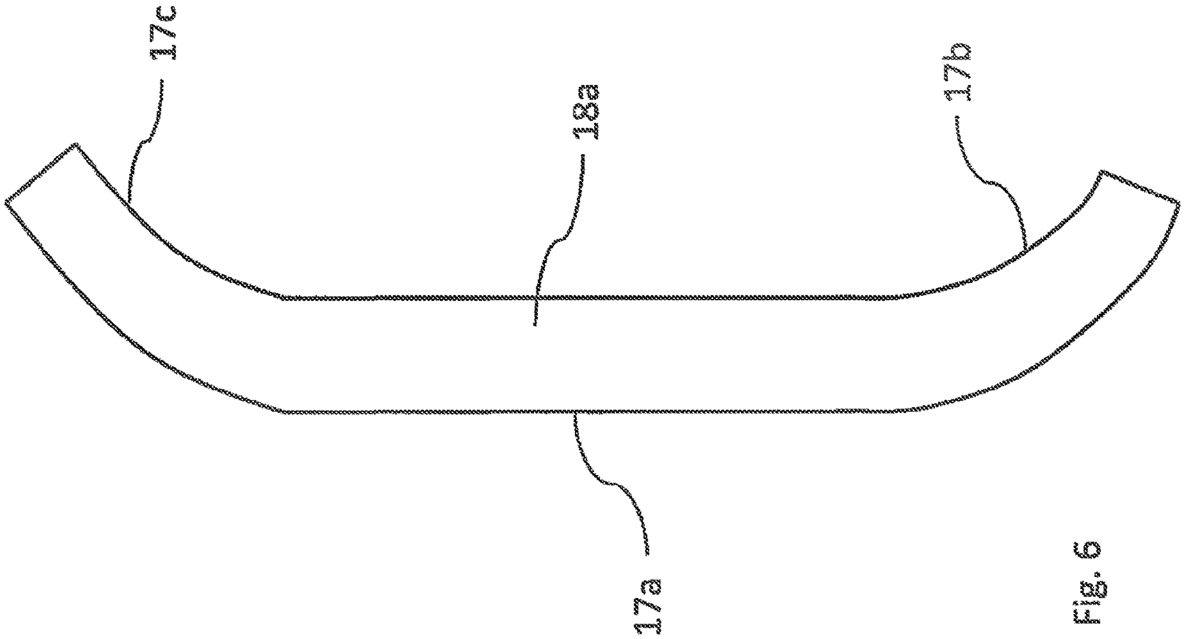
FIG. 6 is a somewhat schematic view of a single louvre forming part of the air guidance system, in which the louvre has three curvatures.

At least some of the louvers 23 may also have a second and/or a third curvature (illustrated schematically in FIG. 6) to more accurately guide the air flow towards the outlets 20. For example, where the air outlets 20 do not extend vertically over the full height of the radiator 16, at least some of the louvres 23 may be curved over at least part of their length so as to guide the air flow not just to the side but also upwardly or downwardly as required to direct the air flow toward an air outlet 20. In an example where the air outlets 20 are positioned in a middle region of the radiator 16 in terms of height, at least some of the louvers 23 may have a central region 17*a* with just the first curvature 18*a* and an upper and/or lower region 17*b*, 17*c* also having a second or a third curvature to also guide the air upwardly or downwardly. Thus, at least some of the louvres 23 may have an upper region which is curved in a sideways and downward direction to guide the air flow in a diagonally downward direction toward the air outlet 20. Similarly, at least some of the louvers 23 may have a lower region which is curved in a sideways and upward direction to guide the air flow in a corresponding diagonally upward direction. The curvature of the louvers 23 is adapted to the location of the outlets 20 and at least some may have a complex curvature in more than one direction.

Figure 5:
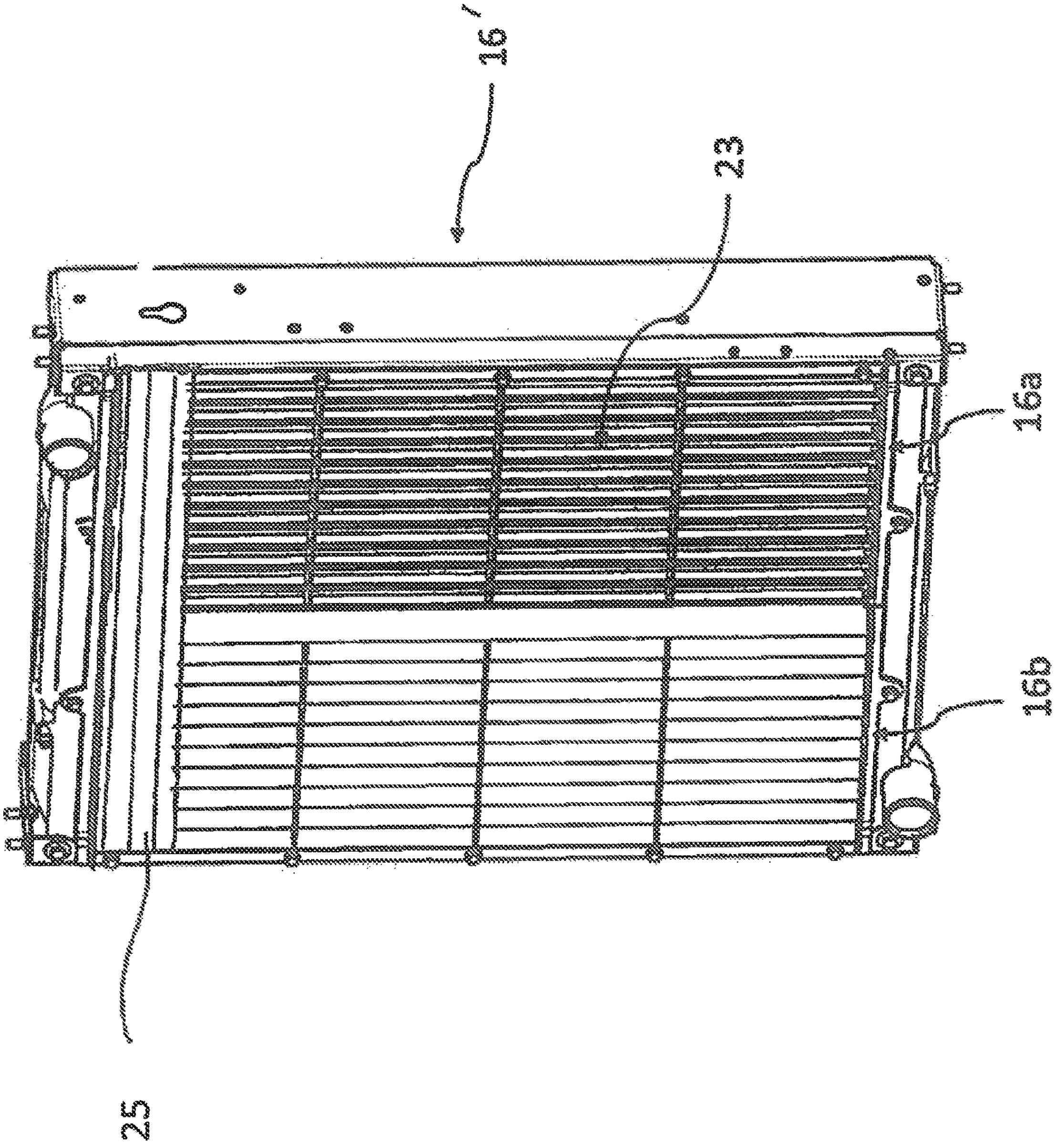
FIG. 5 is a view similar to that of FIG. 3 but showing an alternative arrangement of the air guidance system including additional horizontally aligned louvers for directing air flow to an additional air outlet in an upper region of the engine compartment.

In a further embodiment at least one additional air outlet 21 is provided in an upper part of the engine compartment 8, say in an upper region of the bonnet 9 above the engine 11 as illustrated schematically in FIG. 1. In this case, additional louvers 25 aligned in a horizontal orientation can be provided adjacent an upper part of the radiator 16' and curved to guide the air flow from the upper part of the radiator 16' toward the additional, upper air outlet 21. Such an arrangement is illustrated in FIG. 5.

Figure 4:
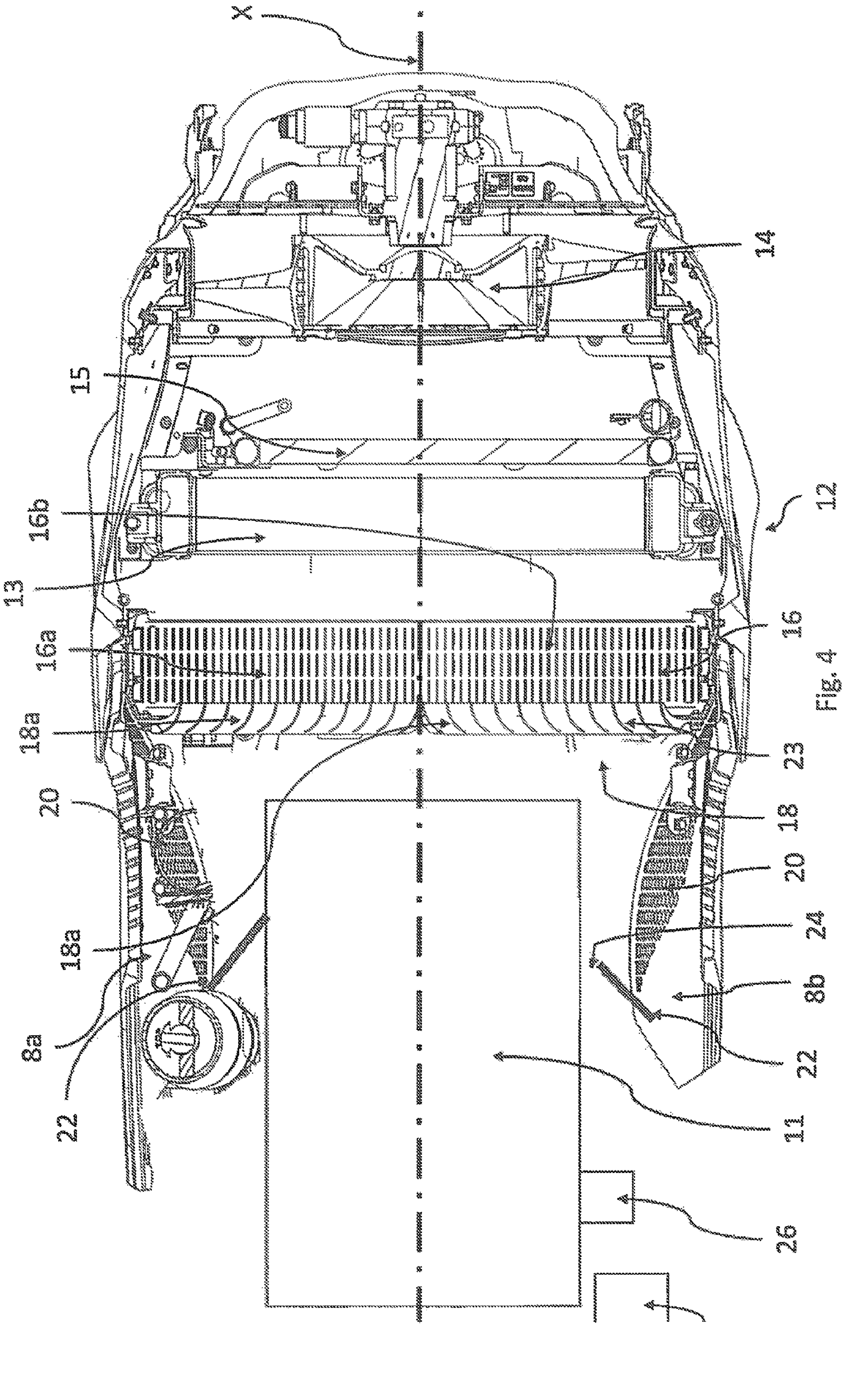
FIG. 4 is a view similar to that of FIG. 2 illustrating an alternative embodiment of an engine cooling arrangement with an air guidance system in accordance with the present disclosure.

FIG. 4 illustrates a further embodiment in which the air guidance system 18 also includes one or more additional air guiding elements 22 arranged to further guide air flow from the radiator 16 about the engine 11 and/or other components located in the engine compartment 8. Whilst the louvers 23 are expected to guide the majority of the air flow exiting the radiator 16 to either side of the engine 11 toward the air outlets 20, in practice not all of the air flow from the radiator 16 can be directed out of the air outlets 20 and some may flow through the engine compartment 8. For components that are temperature-sensitive, such as an electronic controller for example, this air flow which has been heated when passing through the cooling system may be disadvantageous. However, for other components which are at an elevated temperature, such as an engine turbocharger 26 or an exhaust gas collection pipe 28, the airflow may be advantageous to assist in cooling. The additional air guiding elements 22 are in the form of guide plates located and shaped to guide the air flow from the radiator 16 away from some parts of the engine 11 or other components (e.g., temperature-sensitive components) whilst allowing the air to flow over components that benefit from additional cooling. The air guiding elements 22 may be attached to the engine 11 and/or other structural supports the inside of the engine compartment 8.

The additional air guiding elements 22 are configured to prevent parts of the air flow, which are not aligned perfectly with the air outlets 20, from flowing along the sides of the engine 11 over temperature-sensitive components to reduce the risk of them overheating.

At least one of the additional air guiding elements 22 in this embodiment comprises further an opening 24 which allows a part of the air flow to be directed toward components that would benefit from the air flow, such high temperature components like turbocharger 26 and exhaust gas collection pipe 28. The opening 24 may be provided through the air guiding element 22 or the air guiding element 22 may be shaped or otherwise profiled to allow air to flow towards one or more high temperature components, say by passing by an edge of the air guiding element 22.

In alternative embodiments, the at least some of the louvers 23 do not have a first curvature but are angled to direct the air flow exiting the radiator to a respective side of the engine compartment towards an outlet 20.

What is claimed is:

1. A utility vehicle comprising:

an engine located in an engine compartment at least partly enclosed by a hood; and an engine cooling arrangement, the engine cooling arrangement comprising:

at least one radiator located toward one end of the engine compartment and at least one blower configured to create an air flow through the radiator in a direction toward the engine;

air outlets located on either side of the engine compartment and in an upper region of the engine compartment; and an air guidance system with louvers adjacent the radiator and configured to guide air exiting the radiator to flow through the engine compartment towards the air outlets on either side, and wherein the air guidance system comprises at least one additional louver configured to guide part of the air flow toward the air outlet in the upper region of the engine compartment.

2. The utility vehicle of claim 1, wherein the louvers comprise a first set of louvers configured to direct air flow exiting the radiator toward a first of the air outlets on one side of the engine compartment and a second set of louvers configured to direct air flow exiting the radiator toward a second of the air outlets on the other side of the engine compartment.

3. The utility vehicle of claim 2, wherein an orientation of the louvers in the first set mirrors an orientation of the louvres in the second set.

4. The utility vehicle of claim 1, wherein the louvers are directly attached to the radiator.

5. The utility vehicle of claim 1, wherein the louvers are aligned substantially vertically and the at least one additional louver is aligned substantially horizontally.

6. The utility vehicle of claim 1, wherein at least one of the louvers comprises a first curvature configured to guide the air flow exiting the radiator towards a respective one of the air outlets.

7. The utility vehicle of claim 6, wherein the first curvature is configured to direct air exiting the radiator in a lateral direction and wherein the at least one louver comprises at least one additional curvature over at least part of its length to guide the air also in an upward or a downward direction towards the respective air outlet.

8. The utility vehicle of claim 1, wherein the air guidance system further comprises an additional air guiding element mounted within the engine compartment and configured to deflect air flow from the radiator away from at least selected from the group consisting one of the engine and at least one first component within the engine compartment.

9. The utility vehicle of claim 8, wherein the at least one first component is a temperature-sensitive component.

10. The utility vehicle of claim 8, wherein the additional air guiding element is configured to guide at least a portion of the air flow from the radiator toward at least one second component.

11. The utility vehicle of claim 10, wherein the at least one second component is a high-temperature component.

12. A utility vehicle comprising:

an engine located in an engine compartment at least partly enclosed by a hood; and an engine cooling arrangement, the engine cooling arrangement comprising:

at least one radiator located toward one end of the engine compartment and at least one blower configured to create an air flow through the radiator in a direction toward the engine;

air outlets located on either side of the engine compartment; and an air guidance system with louvers adjacent the radiator and configured to guide air exiting the radiator to flow through the engine compartment towards the air outlets on either side, wherein the air guidance system includes a mechanism for adjusting the orientation of at least one of the louvers.

13. The utility vehicle of claim 1, wherein the utility vehicle is an agricultural vehicle.

* * * * *